US006398178B1

(12) United States Patent
Azola et al.

(10) Patent No.: US 6,398,178 B1
(45) Date of Patent: Jun. 4, 2002

(54) ORGANIZATIONAL DEVICE

(75) Inventors: Anthony Azola, 109 Northview Dr., Apartment 12, Blacksburg, VA (US) 24060; Robert R. Blattner, Norwalk, CT (US)

(73) Assignee: Anthony Azola, Salem, MA (US)

( * ) Notice: Subject to any disclaimer, the term of this patent is extended or adjusted under 35 U.S.C. 154(b) by 0 days.

(21) Appl. No.: 09/559,394

(22) Filed: Apr. 26, 2000

(51) Int. Cl.[7] ............................................. B41J 11/02
(52) U.S. Cl. ................ 248/442.2; 248/447.1; 248/918; D19/91
(58) Field of Search ................ 248/442.2, 446, 248/447.1, 447.2, 205.1, 205.2, 205.3, 205.4, 205.5, 206.5, 213.2, 918; 211/50; 206/565; D19/91

(56) References Cited

U.S. PATENT DOCUMENTS

| | | | | | |
|---|---|---|---|---|---|
| 666,674 | A | * | 1/1901 | Hoffmann | 248/447 |
| 794,099 | A | * | 7/1905 | Heaney | 248/442.2 |
| 1,004,334 | A | * | 9/1911 | Anderson | 211/50 |
| 1,475,025 | A | * | 11/1923 | Newman et al. | 40/651 |
| D190,459 | S | | 5/1961 | Curran | D80/9 |
| 4,100,684 | A | * | 7/1978 | Berger | 434/417 |
| 4,693,443 | A | * | 9/1987 | Drain | 248/447.1 |
| 4,696,399 | A | * | 9/1987 | Windorski | 206/565 |
| 4,958,737 | A | | 9/1990 | Auerbach | 206/557 |
| 4,960,257 | A | * | 10/1990 | Waters | 248/442.2 |
| 5,000,327 | A | | 3/1991 | Kincheloe | 211/88 |
| D316,275 | S | * | 4/1991 | Davis et al. | D19/91 |
| 5,161,767 | A | * | 11/1992 | Hansen | 248/447.1 |
| D336,197 | S | | 6/1993 | Wilcox | D14/114 |
| 5,288,050 | A | * | 2/1994 | Armstrong | 248/479 |
| 5,328,145 | A | * | 7/1994 | Charapich | 248/442.2 |
| 5,337,906 | A | | 8/1994 | Digiulio | 211/88 |
| 5,366,070 | A | * | 11/1994 | Wolov | 206/214 |
| 5,480,037 | A | * | 1/1996 | Pope | 211/50 |
| 5,803,275 | A | | 9/1998 | Schweitzer | 211/88.01 |
| 5,880,713 | A | | 3/1999 | Belardinelli | 345/156 |
| 5,931,437 | A | * | 8/1999 | Neuhof et al. | 248/442.2 |
| 5,975,478 | A | | 11/1999 | Marino | 248/442.2 |
| 5,988,582 | A | | 11/1999 | Olivo | 248/442.2 |

* cited by examiner

*Primary Examiner*—Anita King
(74) *Attorney, Agent, or Firm*—Burns, Doane, Swecker & Mathis, LLP

(57) ABSTRACT

An organizational device for organizing post-it notes, and the like, includes a planar member, having one or more sides for organizing notes. The organizational device includes an attachment member which is adapted to be secured to a mounting surface, such as the side of a computer monitor. The device may be stationary or rotatable, and also includes a self-contained unit for holding post-it note pads.

15 Claims, 7 Drawing Sheets

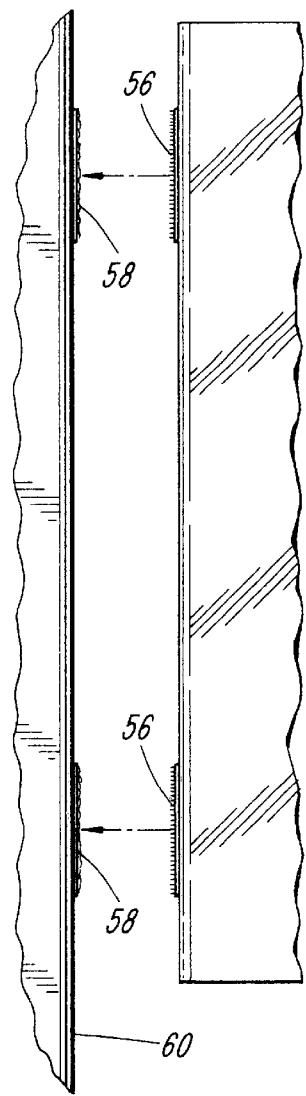
FIG. 4
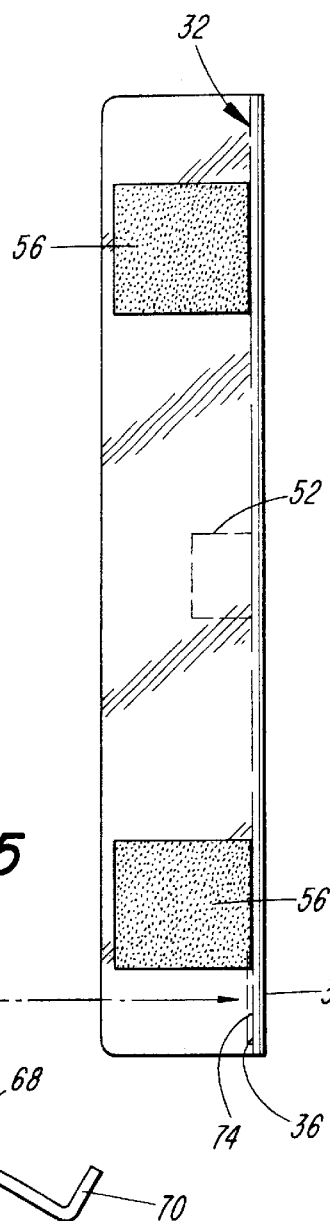
FIG. 5
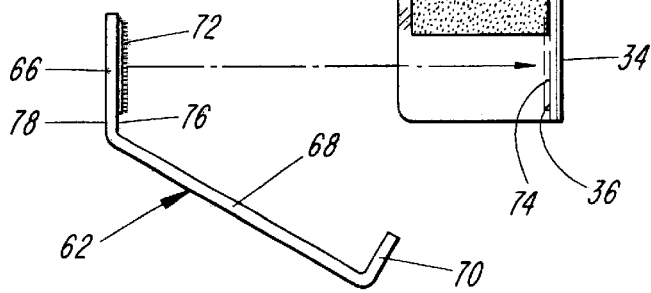
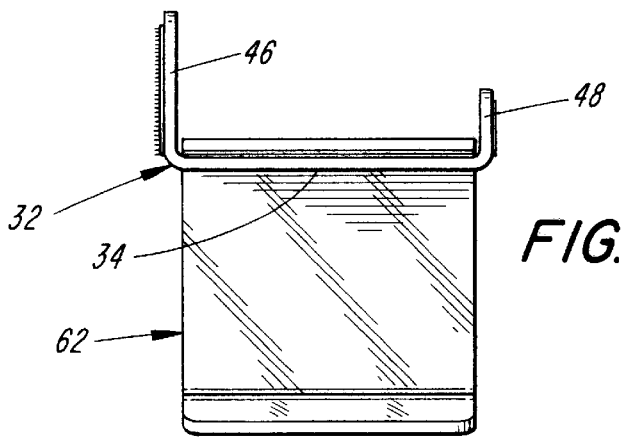
FIG. 6

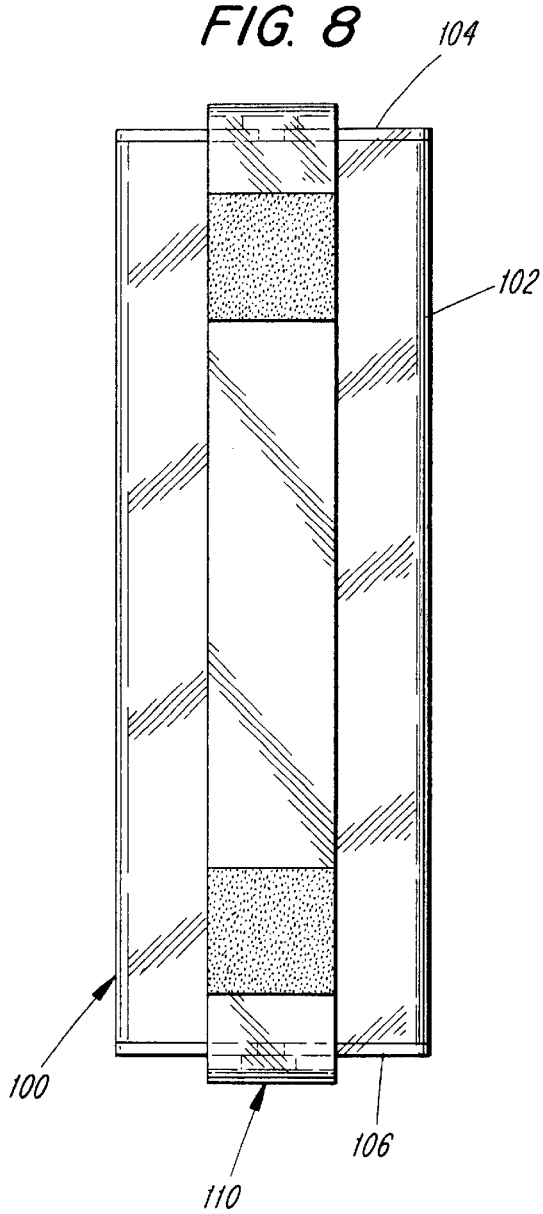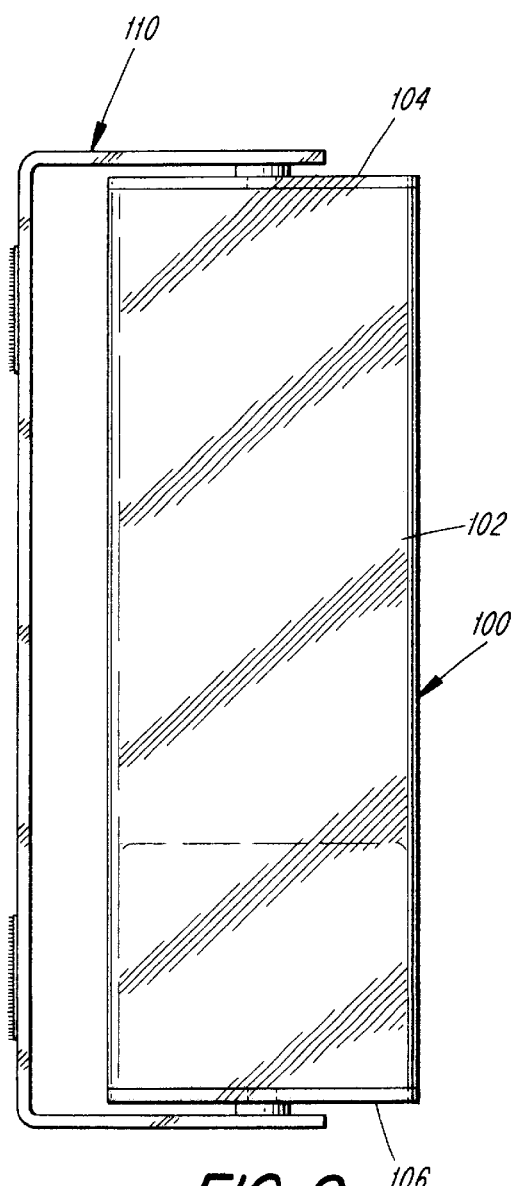

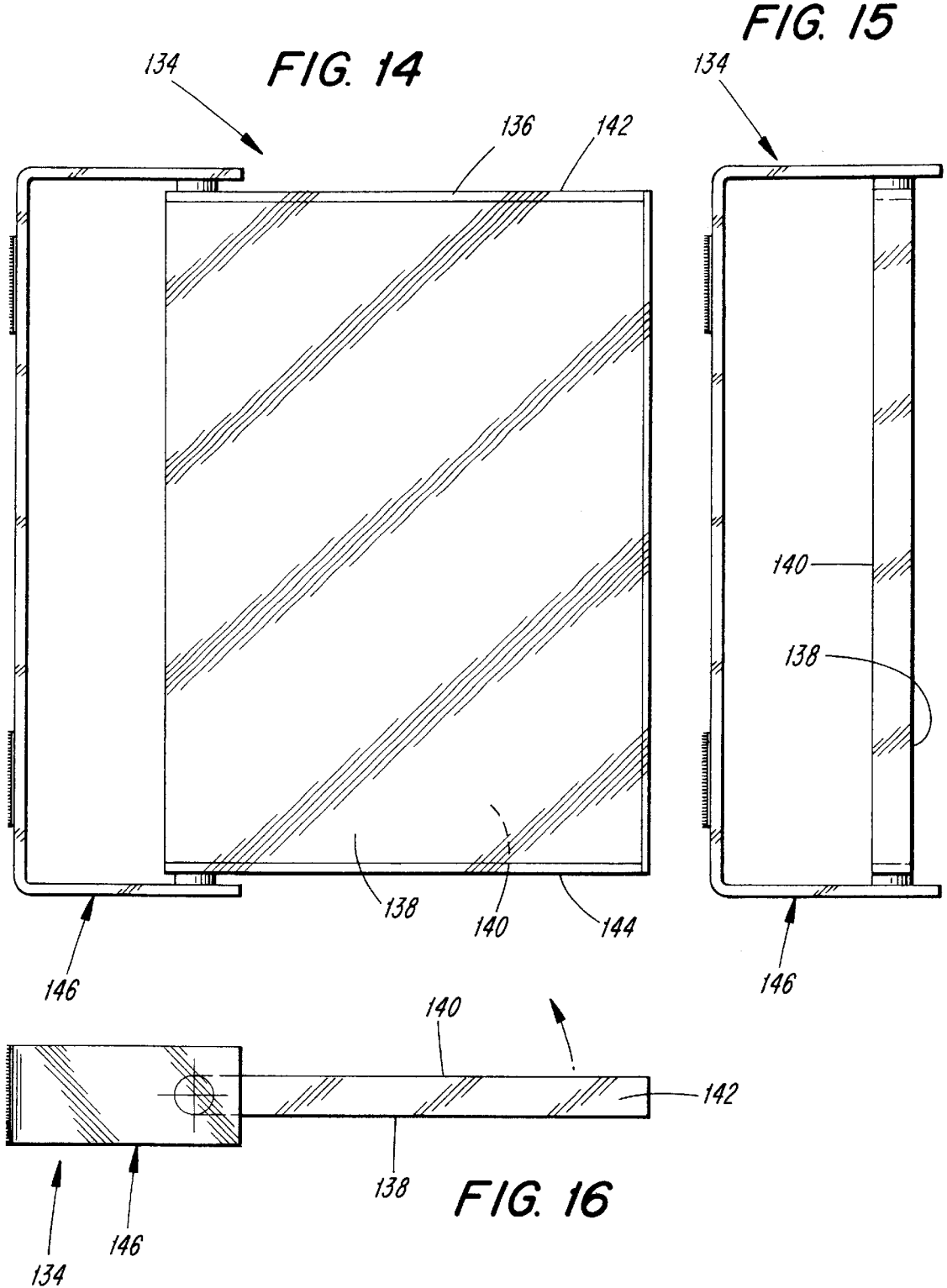

ORGANIZATIONAL DEVICE

FIELD OF THE INVENTION

The present invention relates to a device for organizing notes, messages, to-do lists, and the like. More particularly, the present invention relates to a mountable organizational device for organizing notes, messages, to-do lists, and the like.

BACKGROUND OF THE INVENTION

In today's high paced society, good organizational skills are at the heart of those who are successful. With the advent of computers, programs have been developed that help organize every part of life. Today, personal hand held computers can record day-to-day appointments, addresses, phone numbers, and even e-mail. For instance, both laptop and desktop computers have organizational programs for alerting you to meetings or appointments that are scheduled. All of this technology is great; however, it is still necessary and sometimes even quicker to write things down by hand.

Typically, reminder messages are written on self-adhesive removable notes, which allows them to be posted at a position where the messages are more frequently viewed. At the office, many workers use their computer screens or other office paraphernalia as mounting surfaces to place reminder messages, resulting in a disorganized array of messages. However, messages can obstruct the computer monitor screen, and give off an impression of disorganization.

Similarly, this conglomeration of notes and messages are also found around phones in both offices and homes. Generally, there is very little order to any of these messages or notes. Therefore, there is a need in the art for an organizational device which can neatly arrange notes and messages for both office and home use.

Many prior art devices have been designed to be used in connection with computer monitors or desktops, to help better organize the office or home office. For instance, U.S. Pat. No. 4,958,737 to Auerbach discloses a CRT or computer monitor accessory tray. This accessory tray can be placed atop a computer monitor screen regardless of the monitor's size and shape. The underside of the tray has a rubber friction pad attached near its front, and a bendable wire attached near its rear by means of tubes welded to the underside. The wire is bent to hold the rear of the tray spaced from the top of the monitor so that the tray will not block any air vents in the top of the monitor. This tray provides a place to hold such items as papers, pens, pencils, rulers, a calculator, and other office accessories. However, this tray does not provide the organization of many notes in one space saving location.

U.S. Pat. No. 5,803,275 to Schweitzer discloses an article holding apparatus in the shape of a box. The box has a slanted open top surface to provide easy access to writing instruments, supplies, and personal items. Attachment means is attached to the rear wall, and can be a plastic sheet containing magnetic material which allows the holder to be releasably mounted on a metal support. While this apparatus provides storage for various accessories, it does not provide the organization of many notes in one space saving location. In addition, its mounting capabilities are limited to metallic surfaces, and the like, and could not be easily mounted to a computer monitor screen.

U.S. Pat. No. 5,000,327 to Kincheloe discloses a writing system for use in both dry and wet environments and includes a holder adapted to be releasably supported by a wall surface and defining pen and note pad receptacles. To facilitate all weather use of written materials and writing materials, water-proof paper-like materials are employed on which is printed information with water-proof ink and/or written information with a water-proof writing instrument. However, this writing system does not provide the organization of many notes in one space saving location.

U.S. Pat. No. 5,880,713 to Belardinelli discloses a paper handling instrument for use with a computer. The unit has a tray that is mountable to a computer monitor. The mounted tray has an assigned well located in it, for containing pencils, pens, scissors, rulers, paper clips and other desk accessories. The wells are shaped to accommodate the various office items. However, this instrument does not provide the organization of many notes in one space saving location. Nor does it provide a self contained storage unit for self adhesive note pads, and the like.

U.S. Pat. No. 5,337,906 to Diguilio discloses a wall-mounted device to provide storage for and convenient access to secretarial items such as pens, pencils, writing pads, keys, etc. The device may be mounted on any vertical surface including the box of a telephone. However, this device can not be attached to the side of a monitor screen so that the notes would be visible.

U.S. Pat. No. 5,975,478 to Marino discloses a paper holder for mounting to a computer monitor screen. The paper holder includes a top piece and two side pieces. The top piece is adapted to rest along a top surface of a monitor, and the two side pieces extend downwardly from opposite ends of the top piece, and are adapted to rest along opposite side surfaces of the monitor. The top piece and side pieces each include slots disposed longitudinally therein, through which sheets of paper may be inserted. However, this device was designed to hold larger sheets of paper, and does not contain a large enough surface in which self adhesive notes may be easily accommodated and organized.

U.S. Pat. No. 5,988,582 to Olivo discloses a device for organizing office paraphernalia, which uses a PC as a mounting surface. The device is comprised of a shroud mountable to a PC monitor groove. The shroud is preferably comprised of two adjustable shroud members coupled together by a spring tensioner. A plurality of accessories may be mounted on the outer edges of the shroud members for holding office paraphernalia such as documents, business cards, pens, mirrors, and diskettes. The front face serves as a surface for placing "post-it" notes, or other stick-on paraphernalia. However, this device is bulky in appearance, and is not space saving. In addition, because of its bulkiness, it is not aesthetically pleasing.

Accordingly, there is a need in the art for a simple device for organizing small notes that are needed for daily life and as a receptacle for quick-response action.

Further, there is a need in the art for a simple device which is mountable to a computer monitor for writing messages and notes, which is small in size and aesthetically pleasing.

There is also a need in the art for an organizational device which has self-contained storage units for self adhesive note pads, a writing device, such as a pen, a dry erase marker, and eraser.

SUMMARY OF THE INVENTION

In light of the foregoing, one aspect of the present invention involves providing an organizational device for the organization of notes and messages which is space saving and aesthetically pleasing. The organizational device includes a planar member having a front surface and a back surface, a top edge, bottom edge, inner side edge, and outer side edge. An attachment member extends substantially perpendicular to the planar member and adjacent to the inner side edge of the planar member. The organizational device also includes a support member which extends at an angle to the planar member along the bottom edge of the planar member. This support member provides a surface in which to store self adhesive note pads. A pen may be removeably attached to the device via VELCRO, or the like.

According to another aspect of the invention, a rotatable member includes at least three planar sections, a top surface and a bottom surface. A bracket is rotatably mounting the rotatable member. Attachment means rotatably attach the bracket to the top and bottom surfaces of the rotatable member.

According to yet another aspect of the present invention, the organizational device comprises a planar member having a front surface, a back surface, a top surface and a bottom surface. A bracket is rotatably mounted to the planar member. Attachment means rotatably attach the bracket to the top and bottom surfaces of the planar member.

BRIEF DESCRIPTION OF THE DRAWING FIGURES

Further feature and characteristics of the present invention will become more apparent from the following detailed description considered with reference to the accompanying drawing figures, wherein:

FIG. 4 is a side elevational view of the organizational device and mounting surface, with portions taken away;

FIG. 5 is a side elevational view of the organizational device according to the first embodiment having a support member removed;

FIG. 6 is a top plan view of the organizational device according to a first embodiment;

FIG. 8 is a front elevational view of the organizational device according to a second embodiment;

FIG. 9 is a front elevational view of the organizational device according to a second embodiment;

FIG. 14 is a side elevational view of the organizational device according to a third embodiment shown in a first, operable position;

FIG. 15 is a side elevational view of the organizational device according to a third embodiment shown in a second, stored position; and FIG. 16 is a top plan view of the organizational device according to a third embodiment.

DETAILED DESCRIPTION OF THE INVENTION

The organizational device of the present is described and illustrated to be used in connection with a computer monitor. However, it should be understood that it may be used in connection with other mounting surfaces, such as microwaves, refrigerators, cabinets, desks, cubical walls, televisions, counter tops, walls next to the phone, bathroom walls, cars, service/delivery vehicles, or any other area conducive to quickly taking notes, messages, or memos.

The organizational device of the present invention provides a space efficient, non-obstructive way to organize notes in an orderly fashion. It may be attached stationary, or with the ability of rotation, and has a self-contained storage for post-it note type pads and writing instruments. The organizational device may also be variable in height and width, and not limited to the proportions illustrated in the accompanying figures.

Figure 1:
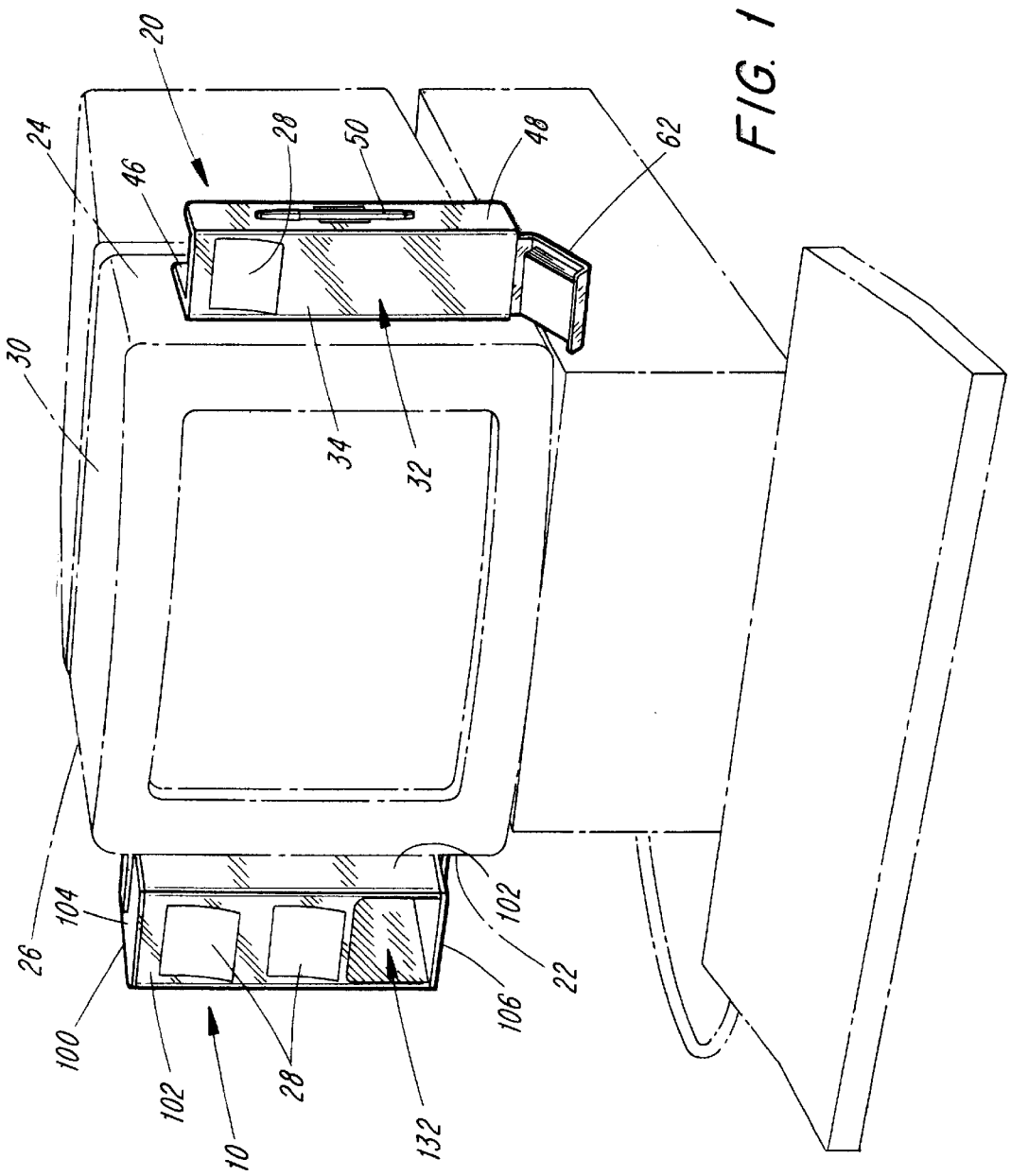
FIG. 1 shows a perspective view of embodiments of the organizational device of the present invention which are mounted on each side of a computer monitor screen.

With reference to FIG. 1, the organizational devices 10 and 20 of the present invention are shown attached to the left side 22 and right side 24 of a computer monitor 26, respectively. When the devices 10 and 20 are attached to either side 22 or 24, post-it notes 28 or other messages may be organized vertically along the devices 10 and 20. However, it should also be understood that devices 10 and 20 may be attached to the top side 30 of a computer monitor 26, where notes 28 may be organized horizontally (not shown).

Figure 2:
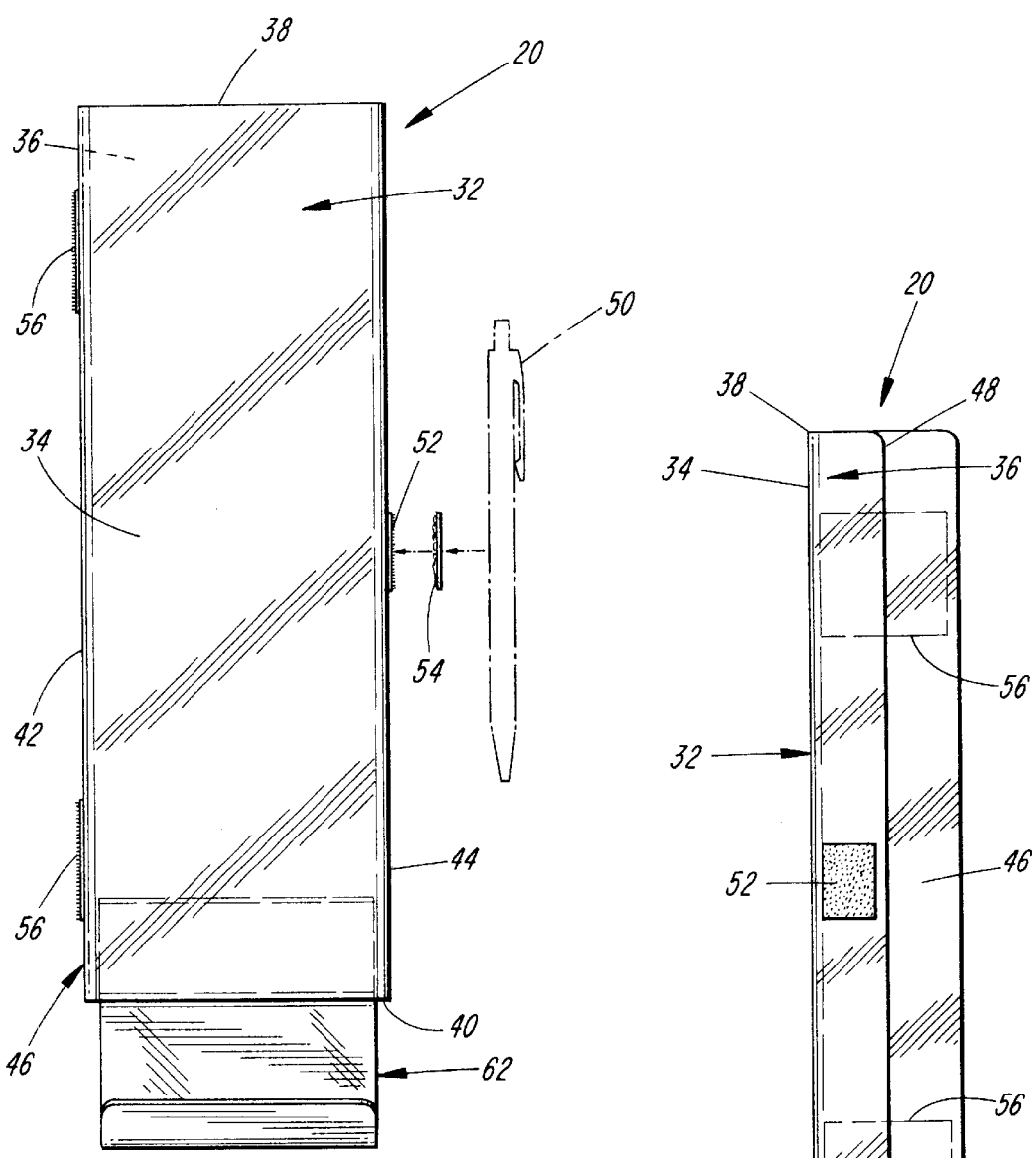
FIG 2 is a front elevational view of the organizational device according to a first embodiment.
Figure 3:
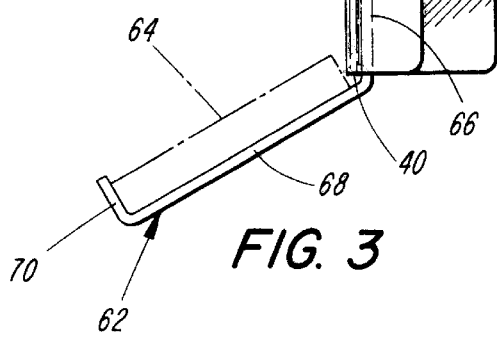
FIG. 3 is a side elevational view of the organizational device according to a first embodiment.

With reference to FIGS. 1, 2, and 3, the organizational device 20 according to a first embodiment is mounted stationary to the right side 22 of the computer monitor 26. However, it may also be attached to the top side 30 and the left side 22 of the computer monitor 26. The device 20 is mounted in a stationary position and includes a planar member 32 for receiving notes 28 and messages. The planar member 32 is preferably made from PLEXIGLAS, but may be made from other materials such as ceramics, acrylics, metal, wood, plastic, LEXAN, cardboard, fiberglass, glass, paper, carbon fiber, or rubber. In addition, planar member 32 may also be made from a material which is dry erasable, and can be used in connection with dry erase writing instruments. Accordingly, planar member 32 can collect notes 28, while also allowing hand written notes to be made on its surface.

Alternatively, the planar member 32 may be made of a cork-like material, which allows messages to be mounted by way of a tack, as well as spring-loaded clip attachments such as binder clips, paper clips, or clothespin devices. This would allow non-stick messages to be pinned to the planar member 32, and thus could act as a bulletin board. The planar member 32 may also be made from a combination of materials, such a section for dry erase marker and a section which is made from cork, depending on application and preference.

With reference to FIGS. 2 and 3, the planar member 32 includes a front surface 34, a back surface 36, a top edge 38, a bottom edge 40, an inner side edge 42, and an outer side edge 44. Preferably, planar member 32 is rectangular in shape, where the inner and outer side edges 42 and 44 of planar member 32 have a length substantially equal to the length of a computer monitor screen. However, it should be understood that the planar member 32 may be any size and shape, depending on application and preference. An attachment member 46 extends along the inner side edge 42 of the planar member 32. The attachment member 46 is preferably perpendicular to the planar member 32, and may be integrally formed therewith. However, attachment member 46 and planar member 32 may be separate pieces, which are permanently affixed via glue, welding, brazing, or the like, and which also depends on the type of material from which the planar member 32 and the attachment member 46 are made. Like the planar member 32, the attachment member 46 is preferably made from PLEXIGLAS, but may be made from other materials such as ceramics, acrylics, metal, wood, plastic, LEXAN, cardboard, fiberglass, glass, paper, carbon fiber, or rubber. However, the attachment member 46 may also be made of a magnetic material, which allows it to be affixed to a metallic object without requiring an additional attachment mechanisms.

The attachment member 46 is preferably planar, and may be attached to a multitude of surfaces, and is not limited to the surface of a computer monitor. The attachment member 46 may be attached to both hard and soft surfaces, as well as flat and/or curvilinear surfaces. In order to accommodate curvilinear surfaces or other non-planar surfaces, the attachment member 46 may be any shape, depending on design preference and application.

Optionally, the organizational device 20 may also include an outer member 48, which extends along the outer side edge 44 of the planar member 32. Outer member 48 provides a surface to attach a writing instrument 50, as shown in FIGS. 1 and 2. The writing instrument 50 is preferably attached to the outer member 48 via male and female VELCRO portions 52 and 54, as shown in FIG. 2. The VELCRO portions 52 and 54 are adhered to the outer member 48 and writing instrument 50 by way of adhesive tape, glue, or the like. However, writing instrument 50 may be attached by a fixed or removable clip, sleeve, box, magnet, or the like.

Preferably, the outer member 48 is coextensive with the outer side edge 44 of the planar member 32. However, it should be understood that outer member 48 may be any size and shape, depending on application and preference. For instance, in the case where VELCRO portions 52 and 54 are used to attach the writing instrument 50 to the outer member 48, the outer member 48 need only be large enough to accommodate the VELCRO portion 52. Member 48 can also be identical in size to member 46 to accommodate attachment portions 56 for the purpose of left side attachment to computer monitor 26.

With reference to FIGS. 2, 3, 4, and 5, the attachment member 46 is preferably attached to the computer monitor 26 by way of attachment portions 56 and 58. In the preferred embodiment, the attachment portions 56 and 58 are male and female VELCRO portions. In the preferred embodiment, there are two spaced attachment portions 56 along the attachment member 46, and two spaced attachment portions 58 along the mounting surface 60, as shown in FIG. 4. While only two attachment portions 56 and 58 are shown, it should be understood that there may be only one attachment portion, or two or more attachment portions, depending on application and preference. In addition, it should also be understood that attachment member 46 may be attached to a mounting surface via bolts, screws, adhesives, suction cups, double-sided tape, magnets, or in any other way customary in the trade, depending on application and preference. For instance, bolts and screws may be used when mounting to a wall, magnets used when mounting to a refrigerator or television set, or suction-cups if in a humid environment.

In the case of the attachment member 46 being made of a magnetic material, no attachment portions are necessary. Depending on attachment materials used (or not used), the attachment member 46 may be permanently or removably secured to the corresponding mounting surface.

Preferably, the attachment member 46 is coextensive with the inner side edge 42 of the planar member 32. However, it should be understood that attachment member 46 may be any size and shape, depending on application and preference. For instance, the attachment portion 46 may be significantly smaller if being mounted to a wall via screws or bolts, and may be just large enough to accommodate one or more mounting screws or bolts. It should also be understood that attachment portion 46 may take the function of outer member 48 when attached to the left side of computer monitor 26.

With reference to FIGS. 1, 2, 3, 5, and 6, a support member 62 extends outwardly from the front surface 34 of the planar member 32. The support member 62 extends at an angle to the planar member 32 so as to act as a support for a post-it note pad 64, as shown in FIG. 3. However, the support member 62 may also be parallel to the planar member 32 (not shown). Additionally, the support member 62 may be any size and shape, depending on the size of the postit note pad it is designed to accommodate.

Preferably, the support member 62 includes a first attachment portion 66, a second support portion 68, and a third flanged portion 70, as shown in FIGS. 3 and 5. The second support portion 68 provides a surface to support the post-it note pad 64. The first attachment portion 66 is preferably angled from the second support portion 68, and provides an adjoining surface to the planar member 32. As such, the first attachment portion 66 is preferably disposed at an obtuse angle to the second support portion 68. However, it may also be disposed at an acute angle. Preferably, the support member 62 is disposed along the bottom edge 40 of the planar member 32, as shown in FIG. 3. However, it may be affixed at other locations along the planar member 32.

The first attachment portion 66 is preferably affixed to the planar member 32 via complementary VELCRO portions 72 and 74, as shown in FIG. 5. VELCRO portion 72 is preferably affixed to an inner face 76 of the first attachment portion 66, while the VELCRO portion 74 is preferably affixed to the back surface 36 of the planar member 32. However, the VELCRO portion 74 may alternatively be affixed to the front surface 34 of the planar member 32, with the VELCRO portion 72 affixed along outer face 78 of the first attachment portion 66. The support member 62 and planar member 32 may also be fixed in other ways, such as with bolt, screws, tape, adhesive, magnets, or in other ways customary in the trade, depending on application and preference. In addition, support member 62 may be integrally formed with the planar member 32. Preferably, the support member 62 is made from PLEXIGLAS, but may be made from other material such as ceramics, acrylics, metal, wood, plastic, LEXAN, cardboard, fiberglass, glass, paper, carbon fiber, or rubber, depending on application and preference.

The third flanged portion 70 is preferably disposed at a perpendicular angle, and provides further cradling of the post-it note pad 64, as shown in FIG. 3. However, the third flanged portion 70 may be disposed at other angles, depending on preference and application.

Figure 7:
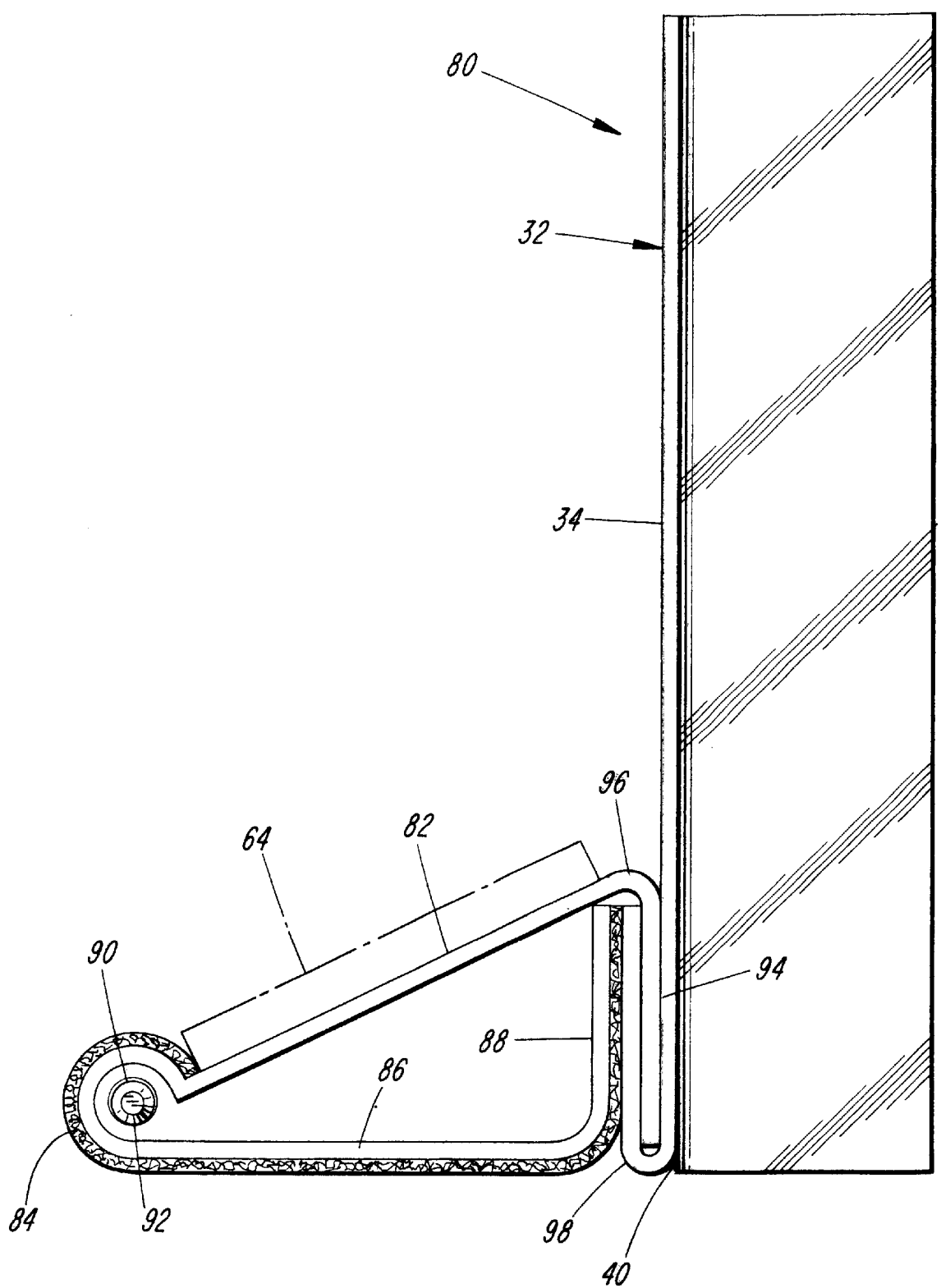
FIG. 7 is a side elevational view of the organizational embodiment according to a first embodiment having a support member according to a second embodiment.

With reference now to FIG. 7, an alternative embodiment of the support member 80 will be described. The support member 80 is attached to the front surface 34 of the planar member 32, and includes a front support section 82, a ring-like section 84, a bottom section 86, and a side section 88. Like the support member 62 of the previously described embodiment, front support section 82 provides an angled support for a post-it note pad 64, and the like. The support member 80 may be made of the same material as provided above with respect to the support member 62, and includes all features therein described. However, the support member 80 also provides storage for a writing instrument.

For instance, a writing instrument 92 may be stored in a channel 90 of the ring-like section 84. In addition, one or more of the sections 84, 86, and 88 may be made of a dry erase material. As such, this embodiment provides multiple functions of providing a support for a note pad 64, which also accommodates a dry erase writing instrument 92, self-contained dry erase surfaces, and a built-in dry eraser. The built-in dry eraser is preferably made of felt, but may be made of any other material capable of dry erasing.

Preferably, the front support section 82, bottom section 86, and side section 88 form a triangularly shaped support member 80. However, the support member 80 may be shaped in other configurations, depending on preference and application.

The support member 80 may be affixed as described above with respect to the support member 62 of the first embodiment. Alternatively, the support member 80 may further comprise a flanged portion 94 along a top edge 96 of the front support section 82. The flanged portion 94 is preferably designed to be accommodated in a U-shaped bracket 98, which is affixed to or a part of the bottom edge 40 of the planar member 32.

With reference now to FIGS. 1, 8, 9, 10, and 13, the organizational device 10 includes a rotatable member 100, having multiple surfaces in which to accommodate post-it notes 28, memos, and the like upon rotation of the rotatable member 100. The rotatable member 100 preferably includes four planar sections 102, but may also include only three, more than four, or any other number according to preference and application. The rotatable member 100 also includes a top surface 104 and a bottom surface 106.

The rotatable member 100 is preferably made from PLEXIGLAS, but may be made from other materials such as ceramics, acrylics, metal, wood, plastic, LEXAN, cardboard, fiberglass, glass, paper, carbon fiber, or rubber. In addition, rotatable member 100 may also be made from a material which is dry erasable, and can be used in connection with dry erase writing instruments. Accordingly, rotatable member 100 can collect notes 28, while also allowing hand written notes to be made on its surface.

Alternatively, the rotatable member 100 may be made of a cork-like material, which allows messages to be mounted by way of a tack. This would allow non-stick messages to be pinned to the rotatable member 100, and thus could act as a bulletin board. The rotatable member 100 may also be made from a combination of materials, such a section for dry erase marker and a section which is made from cork, depending on application and preference.

Figure 10:
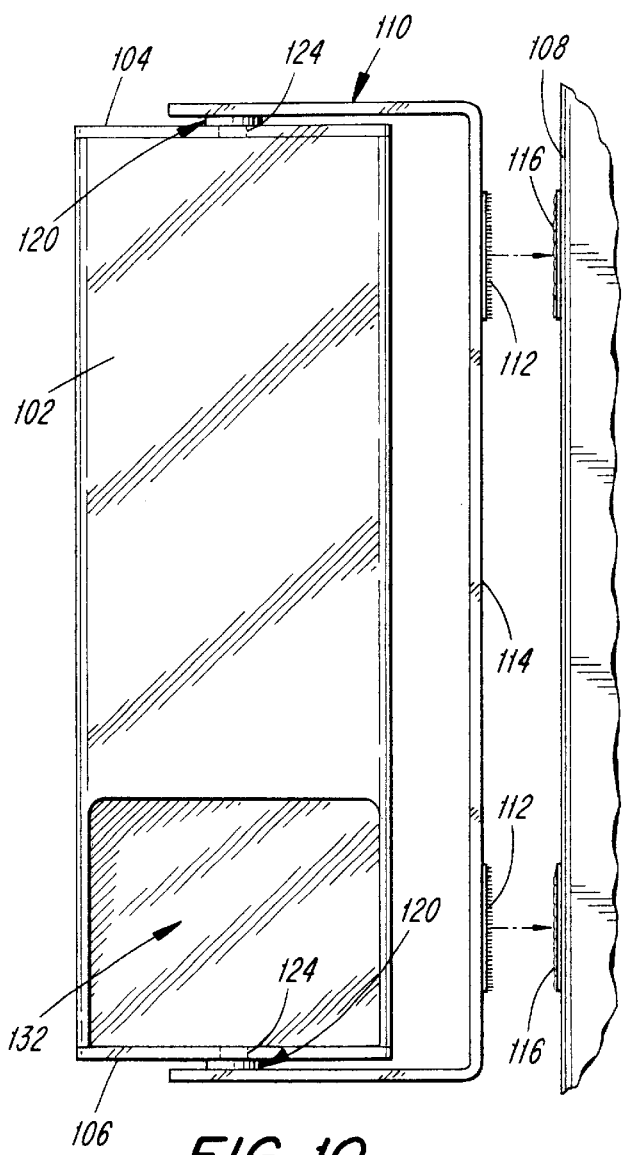
FIG. 10 is a top plan view of the organizational device according to a second embodiment.

The rotatable member 100 is attached to a mounting surface 108 by way of a bracket 110, as shown in FIG. 10. The bracket 110 is preferably C-shaped and includes attachment portions 112, which secures the bracket 110 to the mounting surface 108. In the preferred embodiment, the attachment portions 112 are male or female VELCRO portions, which may be attached to female or male VELCRO portions which are disposed along the mounting surface 108. In the preferred embodiment, there are two spaced attachment portions 112 along an outer surface 114 of the C-shaped bracket 110, and two spaced attachment portions 116 along the mounting surface 108, as shown in FIG. 10. While only two sets of complimentary attachment portions 112 and 114 are shown, it should be understood that there may be only one attachment portion, or two or more attachment portions, depending on application and preference. In addition, it should also be understood that the C-shaped bracket 110 may be attached to the mounting surface 108 via bolts, screws, adhesives, suction cups, double-sided tape, magnets, or in any other way customary in the trade, depending on application and preference. For instance, bolts and screws may be used when mounting to a wall, magnets used when mounting to a refrigerator or television set, or suction-cups used when in a humid environment.

In the case of the C-shaped bracket 110 being made of a magnetic material, no attachment portions are necessary. Depending on attachment materials used (or not used), the C-shaped bracket 110 may be permanently or removably secured to the corresponding mounting surface.

The C-shaped bracket 110 is mounted to the rotatable member 100 via attachment portion 120, as shown in FIG. 10. The attachment portion 120 is preferably a bolt 122, which is received in a recess 124 of both the top surface 104 and bottom surface 106. Optionally, a washer 126 may be inserted between the surfaces 104 and 106 and the bolt 122, to minimize friction. However, it should be understood that bracket 110 may take other forms such as an inverted "L" bracket with an attaching axis from the top of the box, an "L" bracket with an attaching axis from the bottom of the box, a bracket extending perpendicular from the mounting surface that bisects the rotatable member in half, allowing each half the ability to rotate upon a central axis independently of each other, or a combination of any of these.

Figure 11:
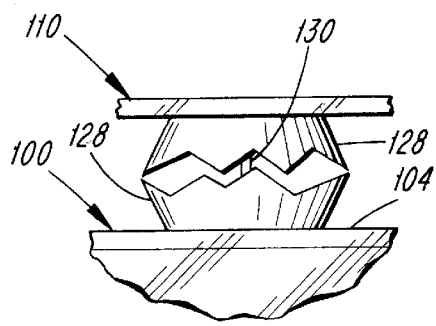
FIG. 11 is a side elevational view of the cam devices of the organizational device according to a second embodiment.
Figure 12:
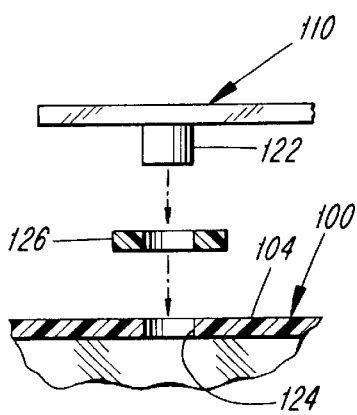
FIG. 12 is a side elevational view of the attachment portion of the organizational device according to a second embodiment.
Figure 13:
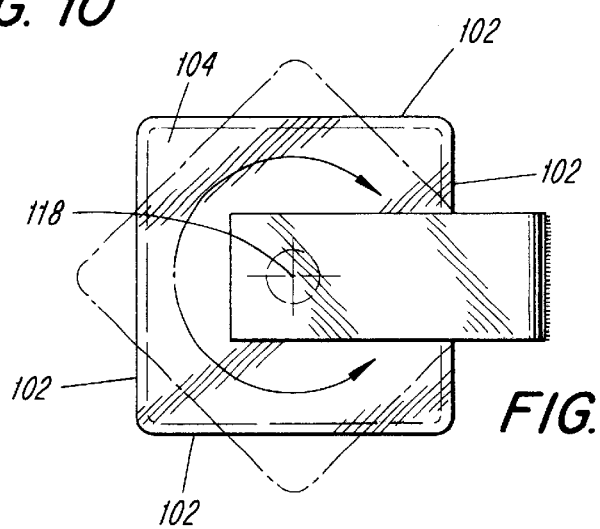
FIG. 13 is a top plan view of the organizational device according to a second embodiment.

With reference to FIG. 11, the attachment portion 120 may be complimentary cam devices 128 disposed about a shaft 130, which allow precise rotation of the rotatable members at various predetermined positions. For instance, in the preferred embodiment, the cam devices 128 allows for four or more predetermined positions of the rotatable member 100, where it locks the rotatable member 100 into place so the planar sections may be written upon without moving. The cam devices 128 will allow movement only with a certain amount of pressure on the surfaces of the rotatable member 100.

The rotatable member 100 is rotatable about a central axis 118, and may be rotated by simply pushing the member 100 by hand. The rotatable member 100 may be rotated in either direction, and may accommodate notes on all of its planar sections 102.

With reference to FIGS. 1 and 10, the rotatable member 100 optionally includes a compartment 132, which is a self-contained storage unit for post-it note pads and the like. The compartment 132 is formed by removing a portion of one of the planar sections 102, and preferably so at a bottom end of the planar section 102. The post-it note pads may be neatly placed in the compartment 132, without requiring a separate unit to support the post-it note pads.

With reference to FIGS. 14, 15, and 16, an organizational device 134 includes a planar member 136 having a front surface 138, a back surface 140, a top surface 142, and a bottom surface 144. The planar member 136 is rotatably mounted to a bracket 146. The bracket 146 is identical in construction and like to the bracket 110 described above. Accordingly, all characteristics of the bracket 110 apply to bracket 146, and will not be repeated here. In addition, the bracket 146 and planar member 136 may be affixed in a similar manner to that already described above with respect to bracket 110 and rotatable member 100. Bracket 146 and planar member 136 are preferably made of PLEXIGLAS, but may be made from other materials such as ceramics, acrylics, metal, wood, plastic, LEXAN, cardboard, fiberglass, glass, paper, carbon fiber, or rubber. In addition, planar member 136 may also be made from a material which is dry erasable, and can be used in connection with dry erase writing instruments. Accordingly, planar member 136 may collect notes 28, while also allowing hand written notes to be made on its surface.

Alternatively, the planar member 136 may be made of a cork-like material, which allows messages to be mounted by way of a tack, as well as spring-loaded clip attachments such as binder clips, paper clips, or clothespin devices. This would allow non-stick messages to be pinned to the planar member 136, and thus could act as a bulletin board. The planar member 136 may also be made from a combination of materials, such as a section for dry erase marker and a section which is made from cork, depending on application and preference.

The organizational device 134 provides a planar member 136 which is rotatable from a first position as shown in FIG. 15, wherein the planar member 136 is parallel to a mounting surface and out of the way, to a second position as shown in FIG. 14, where the planar member 136 may be accessible for writing messages. This allows the planar member 136 to be of a larger construction to allow for a single surface for the attachment of notes and the like, while allowing the planar member 136 to be neatly placed adjacent a computer monitor. The planar member 136 preferably includes a cam device 128 similar to that described above, which allows the planar member 128 to rotate and lock into place between the first and second positions.

One important aspect of the organizational device of the present invention is its ability to receive notes or messages in several different forms and uniquely store note pads and writing implements. Depending on its size, shape, and the material used per application, the organizational device is capable of accommodating brief messages, notations by dry erase marker, post-it note attachments, or equivalent memos, with easy replaceability and up-date capabilities.

The principles, preferred embodiments and manner of use of the present invention have been described in the foregoing specification. However, the invention, which is intended to be protected, is not to be construed as limited to the particular embodiments described. Further, the embodiments described herein are to be regarded as illustrative rather than restrictive. Others may make variations and changes, and equivalents employed, without departing from the spirit of the present invention. Accordingly, it is expressly intended that all such variations, changes and equivalents which fall within the spirit and scope of the invention be embraced thereby.

What is claimed is:

1. An organizational device, comprising:
    a planar member having a front surface, a back surface, a top edge, a bottom edge, an inner side edge, and an outer side edge;
    an attachment member extending substantially horizontal and perpendicular to said planar member and adjacent said inner side edge of said planar member; and
    a support member extending outwardly from said front surface of said planar member, said support member comprising a front support section for holding a note pad, a ring-shaped section for receiving a writing instrument, a bottom section and a side section, said front support section, said bottom section, and said top section form a triangularly shaped support member, wherein said support member and said planar member include complimentary attachment means for removably securing said support member to said planar member.

2. The device of claim 1, wherein said attachment member include at least one attachment portion for attaching the device to a mountable surface.

3. The device of claim 2, wherein said at least one attachment portions are suction cups, bolts, screws, adhesives, or double-sided tape.

4. The device of claim 1, wherein said support member further comprises a flanged portion along a top edge of said front support section.

5. The device of claim 4, wherein said complimentary attachments means include a U-shaped bracket formed along said bottom edge of said planar member, said U-shaped bracket receiving said flanged portion of said support member.

6. The device of claim 1, wherein a portion of said support member includes dry erase material.

7. The device of claim 1, further comprising:
    an outer member extending substantially perpendicular with said outer edge of said planar member; and
    means for removably securing a writing instrument, said means being disposed along said outer member.

8. The device of claim 1, wherein said planar member and said attachment member are made from ceramics, acrylics, metal, wood, plastic, cardboard, fiberglass, glass, paper, carbon fiber, rubber, or magnetic material.

9. The device of claim 1, wherein said support member is attached at an angle to said planar member along said bottom edge of said planar member.

10. An organizational device, comprising:
    a rotatable member having at least three planar sections, a top surface and a bottom surface;
    a bracket for rotatably mounting said rotatable member;
    attachment means for rotatably attaching said bracket to said top and bottom surfaces of said rotatable member;
    wherein said attachment means comprise a pair of cam devices connected via a shaft for precise rotation of said rotatable member around said shaft.

11. The device of claim 10, wherein said bracket is C-shaped.

12. The device of claim 11, further comprising an attachment portion for attaching said C-shaped bracket to a mounting surface.

13. The device of claim 12, wherein said attachment portion is disposed along an outer surface of said C-shaped bracket.

14. The device of claim 10, wherein said top and bottom surfaces of said rotatable member include recesses for receiving said attachment means.

15. The device of claim 10, wherein said bracket and rotatable member are made from ceramic, acrylic, metal, wood, plastic, cardboard, fiberglass, glass, paper, carbon fiber, rubber, or magnetic material.

* * * * *